United States Patent Office 3,826,739
Patented July 30, 1974

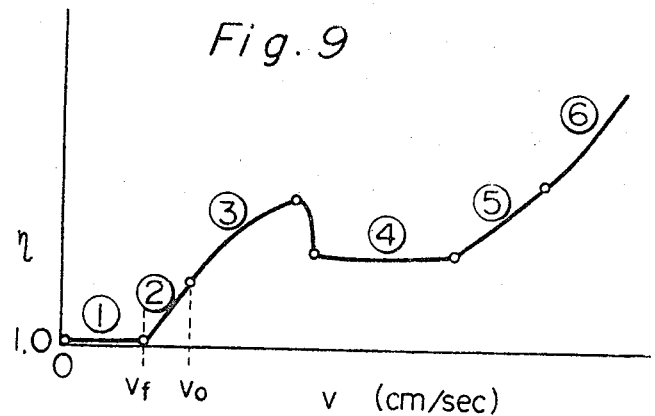
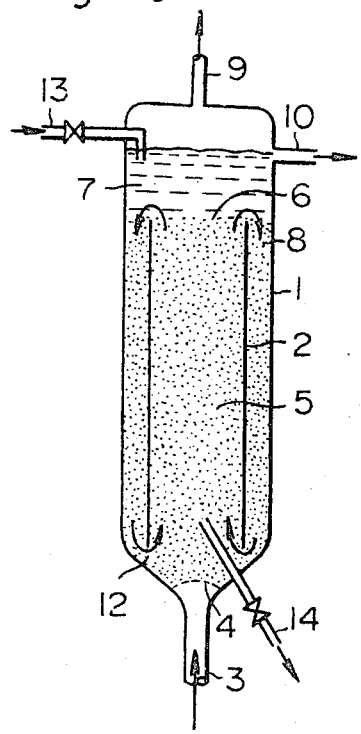
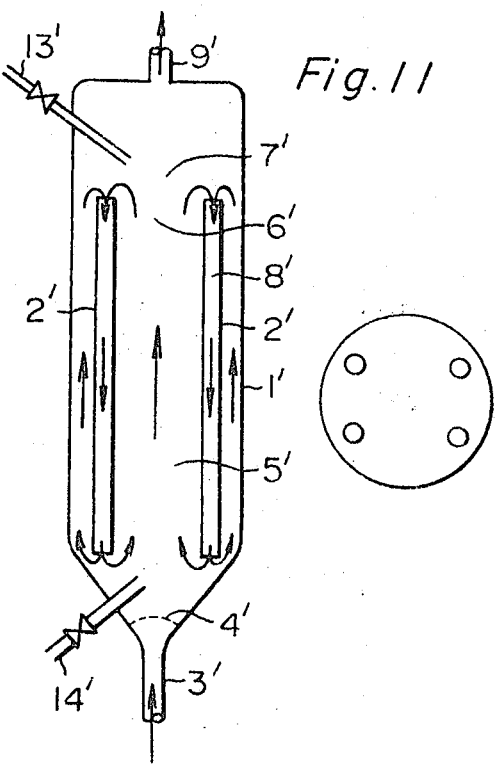

3,826,739
METHOD OF CONTACTING FLUIDS AND SOLID PARTICLES
Junichi Kubo and Yoshio Tajima, Kawasaki, Japan, assignors to Nippon Oil Company, Ltd., Tokyo, Japan
Filed Dec. 28, 1971, Ser. No. 212,913
Int. Cl. C10g 23/10
U.S. Cl. 208—157                                                  8 Claims

ABSTRACT OF THE DISCLOSURE

A process for contacting particulate solids intimately with liquid using a reactor comprising a contact zone (1), a sedimentation zone (2) positioned in series with the contact zone, and an overflow zone (3) positioned above the zones (1) and (2) and having a cross sectional area larger than that of the contact zone, wherein the cross sectional area of the overflow zone and the speed of feeding the liquid upwards from the lower portion of the zone (1) are adjusted to proper values, whereby the particles are fluidized in zone (1) and overflowed from zone (1); the overflowing particles immediately begin to be sedimented in zone (3) without fluidization; and the sedimented particles return from zone (2) to zone (1) without forming an undisturbed layer in the zone (2), in which the particulate solids are deposited, and thus, the liquid and the particles together are circulated from zone (1) to the lower portion of zone (3), zone (2), and zone (1) in this order.

---

Figure 1:
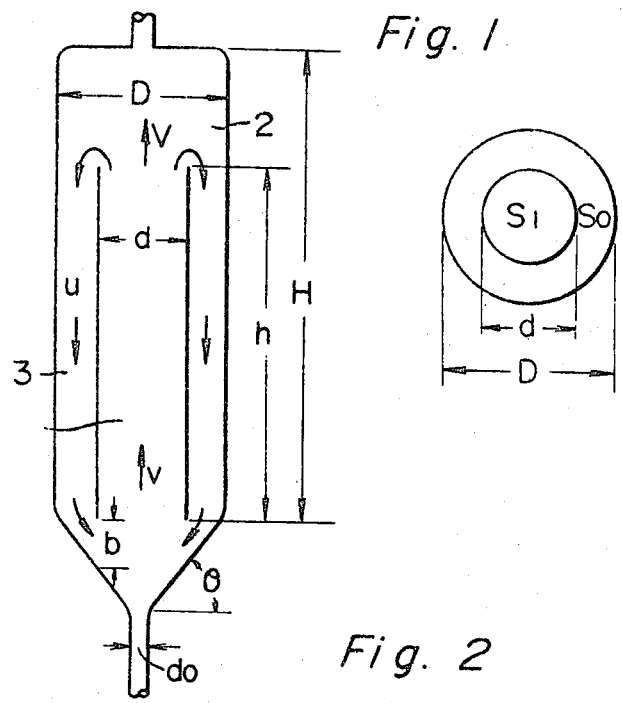

This invention relates to a novel method of effecting contact between fluids and particulate solids. More particularly, the invention concerns a method which is characterized in that an intimate contact between fluids including at least liquid and particulate solids is carried out with industrial advantage under certain specific conditions using an apparatus having a contact zone, an overflow zone and a sedimentation zone.

Heretofore, many methods have been proposed for contacting liquid with particulate solids or for contacting liquid, gas and particulate solids. Particularly in the case of particulate solids being used as the catalyst, many methods are industrially applied as the catalytic reaction method. These catalytic methods are broadly classed into the fixed bed method, moving bed method and fluidized bed method, according to the kind of the state of the bed for the particulate solids. Each of these catalytic methods possess excellent advantages of their own and at the same time give rise to various problems.

For example, in the case of the fixed bed method, the operation is not so complex that it is relatively simple to change the condition of the operation, for instance, to change the flow rate of fluid such as liquid and gas. However, the fixed bed method usually has a draw-back that the grain size of the particulate solids which can be used in this particular method is limited to 2 mm. or above in diameter and that when the deteriorated particulate solids or the particulate solids of which contact operation has been completed are replaced, the replacement has to be carried out by suspending the contact operation. Also, it is difficult in this particular method to maintain a uniform temperature inside the bed, and it is not preferable to apply this method to a catalytic treatment that causes the absorption or development of heat.

In the contact method using a moving bed, one characteristic allows the replacement of the catalyst to be effected without suspension of the catalytic reaction, but this at the same time requires the use of a complicated apparatus and operation, necessitating movement of the bed itself. Accordingly, the reaction is not substantially different from that of the fixed method, and has a similar disadvantage. Accordingly, this method has rarely been successfully employed as an industrially applicable method.

As a method that is different from the methods mentioned above, there is a contact method using a fludized bed in which the particles are in the state of fluid. This fluidized bed can be roughly divided into two types. One type is called the dense phase fluidized bed. The basic state of this type of fluidized bed is that the particles are all as if they were in the same state of liquid. This particular state is attained by housing particulate solids in a vessel and introducing a fluid (liquid and/or gas) from below, preferably through the medium of a distributor, thereby expanding the layer of particles from the originally packed state, so as to allow the particles to be moved substantially. Normally, in this type of dense phase fluidized bed, the flow amount and flow rate of the fluid as introduced from below are adjusted in accordance with the specific gravity and particle size of the particles and with the amount of particles accommodated in the vessel. Thus the particles attain an upward velocity smaller than the terminal end velocity, and thereby are prevented from being discharged out of the system and forming a layer of particles (bed). Accordingly, in this case there is inevitably present an upper layer of bed in the reaction vessel. A typical example may be found in the treatment of hydrocarbons by the boiling bed as described in U.S. Pat. 2,987,465, which is concerned with a method also using this type of fluidized bed. When utilizing this dense phase fluidized bed, since, as mentioned above, the layer of particles displays a behavior as if it were liquid, it is relatively easy to replace or feed anew the particles (catalyst) and, since the catalytic particles are in motion and come in contact with one another, the precipitate deposited on the surface of the catalytic particles is removed. Further it is easy to maintain the bed at uniform temperatures. Owing to the characteristics mentioned above, this particular method is industrially applied.

The method using this fluidized bed, however, has the disadvantage of being very difficult to maintain in a constant state, since the separation of solid particles from the fluid requires a complex procedure to control the operation. Further, the initiation of the operation is extremely difficult and the variable range of operation flexibility is likewise limited. In the case of the foregoing boiling bed, for example, the upper level of the catalyst bed is easily movable by varying the amount of oil fed into the reaction vessel. This presents a disadvantage that the condition of the operation must be controlled exactly to some extent. Furthermore, because of the size and density of the particles of the catalyst, a floating diffusion of the particles of the catalyst on the upper level of the catalyst bed occurs, thereby necessitating a reasonably large area for the separation by standing of the particles from the reaction liquor. Such an unstable operation is due to such an impracticable requirement in this dense phase fluidized bed method. In spite of the fact that the solid particles present in the system are always subject to the force of the fluid coming from below, the upper level of the catalyst bed must be maintained so as not to cause the particles to be discharged from the system.

As the second fluidized bed method, there is a method using a dilute phase fluidized bed. This is a method in which a fluid is introduced from below at such a high velocity that the particulate solids attain a terminal end velocity and are blown out of the system, thereby allowing recovery by collecting the particles by means of a cyclone or a net. One method that is a considerable modification of the above-said dilute phase fluidized bed method is a method in which the particulate solids and the fluid in the suspension state (slurry) are vigorously subjected to circulation by means of a stream of the fluid.

The catalytic cracking method for the hydrocarbon oil by means of F.C.C. (fluidized catalytic cracking) is a typical example of the former dilute phase fluidized bed method which does not employ the circulating stream. (It should be noted, however, that F.C.C. includes in its scope a method that corresponds to the previously mentioned dense phase fluidized bed method.) As the latter method using the circulating stream, a typical example is found in the method mentioned in the German Pat. No. 843,842 in which, using a double-tube reaction vessel, the fluid is jetted from the nozzles to engender a vigorous stream of circulation. These methods using the dilute phase fluidized bed have features that allow use of particulate solids of a very small grain size and accordingly render it possible to impart a large area of contact for a specific amount of particles. Likewise the replacement of the degraded particulate solids can be carried out without the interruption of the running operation and the contact temperature can be maintained comparatively uniform. These methods, however, are generally disadvantageous, as separation of the particulate solids from the liquid is extremely difficult. In the method of the German patent described above, a special separation zone is provided, and according to this particular method it is normal that the suspension-like product slurry needs to be discharged out of the system and separated by means of cyclone or a net. Additionally, in this dilute phase fluidized method, it is essentially difficult to increase the density of the particulate solids in the fluid and owing to this restriction intimate contact between the liquid and particulate solids or between the liquid, gas and particulate solids can not be attained. For example, such a method is not effective for the catalytic oxidation reaction and the catalytic desulfurization reaction that make use of a specific catalytic reaction on the surface of the particulate solids. In this method, it is further necessary to introduce the fluid at such a high velocity that the particles attain the terminal end velocity which contributes to the erosion and corrosion of the various parts of the apparatus and gives rise to frequent mechanical troubles of the apparatus. Still further, the particulate solids which are in vigorous motion are often worn out or broken, thereby requiring the use of particulate solids of intense strength.

The present invention is concerned with a novel method of contact between liquid and particulate solids or liquid, gas and particulate solids which improves the problems encountered during conventional methods of contact.

The object of the present invention is to provide a novel method of contacting liquid with particulate solids or liquid-gas with particulate solids which can be utilized for the physical treatments such as absorption, drying, adsorption, desorption and washing or chemical treatments such as oxidation, reduction, decomposition and hydration, particularly for the isomerization, dehydrogenation, polymerization, reformation and alkylation of hydrocarbons or for the hydrogenation treatments such as decomposition by hydrogenation and hydrodesulfurization.

The inventors had previously found a method of contact by overflowing means which employs, like the present invention, an apparatus having a contact zone, an overflow zone and a sedimentation zone, in which the fluid state of the particles is utilized in the contact zone and the particles overflow from the contact zone to the overflow zone, the overflown particles move further into the sedimentation zone and in the sedimentation zone a compact packing of the particles is carried out and the particulate solids circulate slowly while forming an undisturbed layer, but the fluid does not substantially circulate. Such method is described in U.S. Application Ser. No. 46,862, filed June 17, 1970.

The inventors further made a devoted investigation and found a new method of contact which differs from and is superior to the above-said contact system of the prior application, and completed the present invention. That is, the present invention concerns a contacting method in which the particulate solids and the fluid circulate together without the formation of the undisturbed layer in which the particulate solids are packed, and is a method which does not accompany a vigorous stream of circulation and which allows substantially all the particulate solids that have overflown from the contact zone to the overflow zone to move and circulate immediately to the sedimentation zone and at the same time maintain the state of contact.

The contacting method of the present invention differs from the method described in the German Pat. No. 843,-842 in that the former does not cause a vigorous stream of circulation. The contacting method of the present invention also differs from the method which the same inventors had previously proposed in that in the former the fluid joins the particulate solids in moving and circulating and the undisturbed layer of the particulate solids is not formed.

According to the present invention, a method of contacting particulate solids with fluids is provided, including at least liquid which comprises contacting particulate solids intimately with fluids including at least liquid with the use of a reaction apparatus having (1) a contact zone, (2) an overflow zone, the lower portion of which is connected to the upper portion of the contact zone and the cross sectional area of which is larger than the contact zone and (3) a sedimentation zone, the upper portion of which is connected to the lower portion of the overflow zone and the lower portion of which communicates with the lower portion of the contact zone, said method including the steps of (a) placing the solid particles within the contact zone (1); (b) passing the fluids from below in a upward direction at a linear flow rate sufficient to fluidize the particulate solids within the contact zone (1) and to make them overflow from the contact zone (1), the linear flow rate at this time of the fluids within the overflow zone (2) being made smaller than the fluidization initiating velocity of the particulate solids and the moving velocity of the particular solids within the sedimentation zone (3) being made larger than the spontaneous sedimentation velocity of the particulate solids, so that substantially all of the particulate solids that have overflown from the contact zone (1) to the lower portion of the overflow zone (2) may be thereby immediately moved to the upper portion of the sedimentation zone (3) where the particulate solids and the fluids join together. The continuous circulation of particulate solids is from the lower portion and the upper portion of the contact zone (1), to the lower portion of the overflow zone (2), to the upper portion and the lower portion of the sedimentation zone (3) and to the lower portion of the contact zone (1), and the contacting is effected substantially within the contact zone (1); and (c) discharging a portion of the fluids so contacted out of the system from the upper portion of the overflow zone (2).

In the following, the method of the present invention will be described in greater detail with reference to the drawings.

Figure 2:
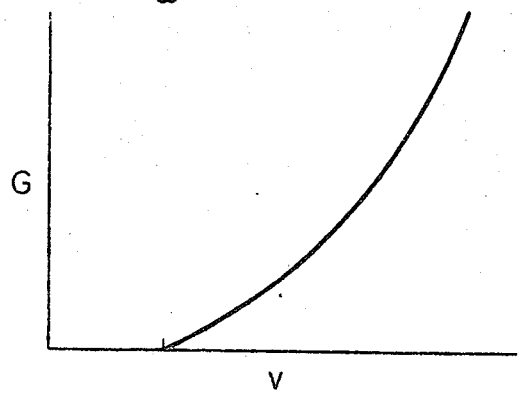

FIG. 1 is a drawing illustrative of the specification of the apparatus to be used in the present invention and of the method of effecting contact. FIG. 2 shows the relationship between the circulating amount of the particulate solids and the flow rate of the fluid. FIG. 3 thru FIG. 8 inclusive, are graphical representations describing various kinds of contacting methods and behavior of particles. FIG. 9 displays the relationship between the linear velocity of the fluid and the coefficient of expansion of the particles. FIG. 10 and FIG. 11 give an example of the apparatus to be used in the contacting method of the present invention.

FIG. 1 shows the cross sectional view of a sketch of a reaction vessel, as an example of the apparatus to be used in the method of the invention, which has a cylindrical internal tube coaxially positioned in a cylindrical vessel.

The vessel is charged with particulate solids and the fluid is introduced from the lower portion of the vessel, to effect the method of this invention. In this case, the inside 1 of the internal tube serves as the contact zone, the upper portion 2 from the uppermost end of the internal tube serving as the overflow zone and the space between the internal tube and the external tube serving as the sedimentation zone. As shown illustratively, the cross section of the overflow zone (2) is always large, as compared to the contact zone (1).

The method of the present invention is for performing the contact between the particulate solids and the fluids including at least liquid. As the fluids, there are two cases: one is where the fluid consists of only a liquid phase and another is where the fluid consists of a mixed phase of the liquid phase with the gaseous phase present as bubbles. In both cases, since it is the liquid that exerts the primary influence on the fluidity of the solid particles, the term "linear flow rate" as used in the following part of the specification and claims refer to the linear flow rate of the liquid. In the specification the linear flow rate in the contact zone (1) is expressed by $v$ (cm./sec.) and the linear flow rate of the fluid in the overflow zone (2) is expressed by $V$ (cm./sec.). In the apparatus to be used for the method of the invention the cross sectional area of the zone (2) is always larger than the cross sectional area of the zone (1) and consequently $V$ is always smaller than $v$.

In FIG. 1 in order that the particulate solids housed in the inside 1 of the internal tube may be fluidized, $v$ needs to be larger than the fluidization initiating velocity (which will be expressed by $vf$ (cm./sec.) of the particulate solids. The value of $vf$ is determinable by the nature of the fluid and the shape and nature of the particulate solids.

$$v > vf \tag{1}$$

When there is a relation of (1), the particulate solids inside the internal tube are fluidized and the layer of particulate solids expands. Generally, the coefficient of expansion ($\eta$) can be defined as follows.

$$(\eta) = \frac{1/\rho}{1/\rho_0} = \frac{\rho_0}{\rho} \rho_0 \tag{2}$$

In the foregoing equation indicates the density (g./cm.$^3$) of the particulate solids present in the space contact zone (1) when fluidization does not take place (that is, $v < vf$) in the contact zone (1) and a packed layer of the still particulate solids (this state is corresponding to the state shown in FIG. 3) is present. $\rho$ represents the density of presence of the particulate solids in the space of the contact zone (1) which is in the state of fluidization. $\rho_0 \geq \rho$ and hence $\eta \geq 1$. $\eta = 1$ corresponds to FIG. 3 wherein the fluidization does not take place. When the fluidization does take place and the upper level of the layer of the particulate solids is present in the inside of the internal tube (this case is corresponding to the state of FIG. 4), the coefficient of expansion ($\eta$) may be reasonably defined as follows.

$$\eta = hf / \overline{h}$$

wherein $\overline{h}$ represents the height of the layer of the particulate solids at the time when no fluidization takes place and $hf$ represents the height of the layer of the particulate solids at the time when fluidization takes place.

Now, the value of this coefficient of expansion is a function, in the case of the apparatus of the type shown in FIG. 1, of the linear flow rate $v$ of the fluid inside the internal tube and at the same time is variable with the physical properties and the shape of the particulate solids, the structure of the reaction apparatus (ratio $D/d$ between the diameter of the internal cylinder and the internal diameter of the reaction vessel, height ($h$) of the internal cylinder, incline ($\theta$) of the lower inclined portion, interval ($b$) between the lowermost end and the lower inclined portion of the internal cylinder, etc.) and with the smoothness of the surface as well as with the physical properties of the liquid.

In the invention method, the particulate solids circulate in order of the contact zone (1), the overflow zone (2), the sedimentation zone (3) and the contact zone (1). The amount of the particulate solids circulated is an amount, like the coefficient of expansion, that makes a complicated variation depending upon various factors, such as the physical properties and the shape of the particulate solids and the structure of the reaction apparatus (in FIG. 1, $D/d$, $h$, $\theta$, $b$, $do$ and the structure of the blow inlet, etc.) as well as the smoothness of the internal surface of the reaction apparatus. But when only the flow rate $v$ is allowed to vary with all other factors being kept constant, the circulation amount $G$ of the solid particles is generally represented as shown in the diagram of FIG. 2. Namely, when the factors other than $v$ are kept constant, $$G = f(v) (\text{cm.}^3/\text{sec.}) \tag{3}$$

In the foregoing, $f(v)$ is a function that, as shown in FIG. 2, makes a monotonous increase, and accordingly the moving speed $v'$ of the solid particles in the sedimentation zone (3) is expressed by the following equation.

$$v' = G/S_0 (\text{cm./sec.}) \tag{4}$$

In the above equation $S_0$ is the cross sectional area (cm.$^2$) of the sedimentation zone (3). In FIG. 1, $S_1$ represents the cross sectional area of the contact zone and its relation to $S_0$, the cross sectional area of the settling zone, is calculated by the formula:

$$S_0 = \left(\frac{D}{2}\right)^2 \pi - S_1$$

On the other hand, suppose that the velocity with which the particulate solids fall spontaneously through the liquid is $\overline{v}$ (cm./sec.) then $\overline{v}$ is determined by the physical properties of the liquid and the shape as well as the physical properties of the particulate solids. It is usually given by the Stokes' equation.

In case $v'$ is larger than $\overline{v}$, the layer of the particles does not form the so-called undisturbed layer of particles in the sedimentation zone (3) and moves downward instead at a speed faster than the sedimentation speed, but in case of $v'$ being smaller than $\overline{v}$, the layer of particles forms a layer of particles which is protected from disturbance by the outer tube and moves downward in this particular state. Also, when the linear flow rate of the fluid is made constant, the factors govering the circulation amount $G$ of the particulate solids are mainly the resistance to move of the particulate solids in the external tube 3 and the resistance to move of the particles from the lower portion of the sedimentation zone (3) to the internal tube 1. Accordingly, the width and the cross sectional area as well as the shape of the lower inclined portion of the sedimentation zone (3) and the interval between the lower portion of the internal tube and the lower inclined portion are important factors that influence $G$. Accordingly, by suitably selecting these factors, it is possible to vary the value of $v'$ over a reasonably wide range.

On the one hand, in the invention method a part of the fluid that has been contacted is discharged out of the system from the upper portion of the overflow zone (2). In this regard, when the operation is carried out in a conventional way, the amount of the fluid the amount is substantially the same as that of the fluid that was introduced from the lower portion of the contact zone (1) is discharged out of the system from the upper portion of the overflow zone (2).

An important characteristic of the method of the invention consists in the contact treatment being performed under such a condition that satisfies the two conditions of $V < vf$ and $v' > \overline{v}$.

Now, in order to understand clearly the essential nature of the method of this invention, it may be useful to observe the various states of motion of the particulate solids which emerge correspondingly when the linear flow rate $v$ of the fluid in the contact zone (1) is varied in reference to the apparatus shown in FIG. 1. In this connection, the description will be made in the following with reference to FIG. 3 thru FIG. 8 and FIG. 9.

Figure 3:
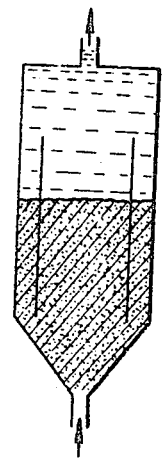

(1) In case of $v<vf$:

Particulate solids are all at rest and fluidization does not take place. This condition is shown in FIG. 3 and is corresponding to the condition shown by ① in FIG. 9. For information's sake, the part indicated by oblique lines in FIG. 3 shows that the particles are present in a tight shape and they are not in the state of fluidization. The height of the layer of the particulate solids in this particular state in the internal tube is expressed by $\bar{h}$.

Figure 4:
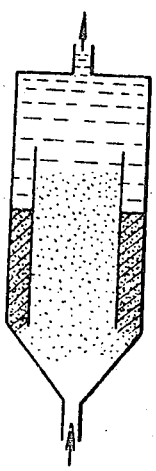

(2) In case of $vt>v>vf$ and $\eta \leq h/\bar{h}$:

In the foregoing formula $vt$ represents a terminal velocity (cm./sec.) of the particles, and $h$ represents the height of internal tube 1. The terminal velocity $vt$ of the particles represents the minimum flow rate of the fluid which accompanies the particles and can carry them away to the distance of infinitude, and is a value determined by the shape and property of the particles as well as the property of the fluid. Now, when $v$ attains a velocity higher than $vf$, the particles in the internal tube begin to fluidize. In the stages where $v$ is not so large, the coefficient of expansion is relatively small and the upper level of the particle layer is yet to exceed the uppermost end of the internal tube and accordingly the solid particles are flowing, but not overflowing. Hence, the circulation of the particulate solids is not taking place. The state that is stipulated by the foregoing formula corresponds exactly to this particular state, which is shown in FIG. 4 in which dots indicate the particles that are undergoing fluidization. This also corresponds to the state indicated by ② in FIG. 9. The state of the dense phase fluidized bed mentioned in U.S. Pat. 2,987,465, which was previously cited, comes under this category.

(3) In case of $vt>v\geq vf$, $\eta>h/\bar{h}$ and $V<vf$:

In the state of the foregoing (2), if $v$ is gradually increased, the coefficient of expansion becomes gradually increased until at last when $v$ has reached a certain velocity (indicated as $v_0$), $\eta$ becomes larger than $h/\bar{h}$, at which the solid particles begin to overflow from the internal cylinder 1. This is shown by the movement of the state ② to the state ③ in FIG. 9 under $v=v_0$ condition. Generally, the cross sectional area of the overflow zone is sufficiently larger than the cross sectional area of the contact zone and so the value of V at the time of $v$ having reached $v_0$ is generally $V<vf$. However, if the cross sectional area of the overflow zone is not so large, as compared with the cross sectional area of the contact zone, $V \geq vf$ may have already occurred when $v$ reaches $v_0$. In the present invention, as already mentioned, it is necessary to effect the contact in such a state as $V<vf$, and therefore the method of the present invention is not practicable by such an apparatus. However, if only the cross sectional area of the overflow zone is made sufficiently large, as compared with the cross sectional area of the contact zone, V can always satisfy the situation of $V<vf$ under the condition of $v=v_0$, and so the subsequent description will be made of only such a system.

Figure 5:
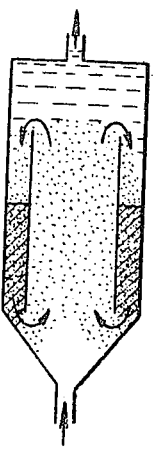

In the case of $\eta>h/\bar{h}$ and $V<vf$, the particulate solids inside the internal cylinder flow and the upper level of the layer of the particles exceeds the uppermost end of the internal cylinder with the particles overflowing, but because of $V<vf$, the fluidization of the particles does not take place at all in the overflow zone and accordingly the particles in an amount that is equal to the amount of the particles that overflow fall down into the sedimentation zone (3) and move again into the internal cylinder from the lower portion of the sedimentation zone. Now, referring to FIG. 9, for some time immediately after the shifting from the state ② to the state ③ (that is, in case of $v$ being only a slightly larger than $v_0$), the circulation amount G of the particulate solids generally shows a small value and so, as indicated by the above-described formula (4), $v'$ also shows a small value. Hence, $v' \leq \bar{v}$. When this exists there is present, as already described, an undisturbed layer of the particles in the sedimentation zone (3) and the layer of the particles moves downward slowly, while maintaining this particular state. And the particles circulate from the lowermost end of the undisturbed layer of the particles to the internal cylinder 1 in succession. This state is shown in FIG. 5. That is, the particles in the inside of the internal cylinder are fluidized and overflow, falling down to the sedimentation zone. The presence of the undisturbed layer of the particles in the lower portion of the sedimentation zone (indicated by the portion occupied by the oblique lines) is illustrated. In this state the flowing and circulation of the liquid do not take place, as the liquid is prevented by the presence of the undisturbed layer of the particles. In the specification the state that is characterized by the formula showing the relation of $v' \leq \bar{v}$ will be hereinafter called "a state."

Now, when there is "a state," if $v$ is allowed to increase gradually, G increases with the increase of $v$ and also increases $v'$. And at last at a certain value of $v$, $v'$ becomes larger than $\bar{v}$. In the specification, the state that is characterized by this relation will be hereinafter called "b state."

Now, suppose that at the time of the "a state" beginning to shift to the "b state" there are two situations represented by the formulae $Vt>v\geq vf$ and $V<vf$ held good. If the formula $V<vf$ does not hold good, it is possible, as previously said, to make the formula $V<vf$ hold always good by making the cross sectional area of the overflow zone sufficiently large, as compared with the cross sectional area of the contact zone. Therefore, the description will be made with reference to only such an apparatus. By such a limitation, the relation of $V<vf$ becomes guaranteed to hold good. On the one hand, there is not always a guarantee as to the general characteristic of $Vt>v\geq vf$ to be applicable at all times. The cases where this formula is not properly applicable will be separately explained later.

Figure 6:
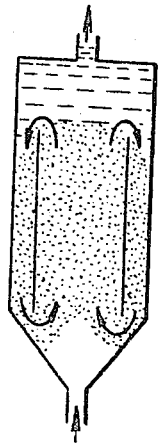

Now, if the situation is such that is represented by the formulas $Vt>v\geq vf$, $\eta>h/\bar{h}$ and $V<vf$ and the "b state" emerges, there is not formed an undisturbed layer of the particles in the sedimentation zone, as previously mentioned, for $v'$ is larger than $\bar{v}$, and accordingly the fluid, too, flows downward into this sedimentation zone, so that the solid particles and the fluid fall down into the sedimentation zone together, and circulate and flow to the contact zone. And since the relation of $V<vf$ is applicable, substantially all of the particles that have overflowed from the contact zone to the overflow zone move immediately to the sedimentation zone and fall for the reason previously explained. This state is as shown in FIG. 6. There is no undisturbed layer of the particles present and the particles and the fluid are flowing by circulation as one body in the same density of presence of the particles throughout the contact zone and the sedimentation zone. All this is shown in FIG. 6. If the state of this FIG. 6 is compared with the state of FIG. 5, it will be seen that in the state of FIG. 5 there is present a standing layer of the particles in the lower portion of the sedimentation zone, which is packed tightly with the particles and which accordingly has a very high density of presence of the particles, while in the state of FIG. 6, on the one hand, there does not exist such a layer. Therefore, if the attention is paid to the density of presence $\rho$ of the particles in the contact zone, it is obvious that $\rho$ of the state of FIG. 6 is larger than the $\rho$ of the state of FIG. 5. Therefore, as is apparent from the previously described formula (2), when the change of the state of FIG. 5 to the state of FIG. 6 takes place, such a change accompanies some decrease in the coefficient of expansion and once the change to the state of FIG. 6 has been attained, even if $v$ is increased in the subsequent steps, it only causes the increase in the circulation flow speed and $\rho$ remains constant at all times, as long as the state of FIG. 6 is maintained, and accordingly the coefficient of expansion is also maintained constant.

The phenomenon that was elaborated above corresponds to the change from the state ③ to the state ④ in FIG. 9. The method of the present invention is characterized by the solid and the fluid being contacted with each other in the state of FIG. 6 or in the state ④ of FIG. 9. On the one hand, according to the method which the inventors had previously set forth, the solid is contacted with the fluid in the state of FIG. 5 or in the state ③ of FIG. 9.

In the above-said state of FIG. 6, if $v$ is allowed to increase further, the state of (4) that is stipulated by the following formula generaly emerges.

(4) $Vt > v > vf$, $\eta > h/\bar{h}$ and $Vt > V \geqq vf$

Figure 7:
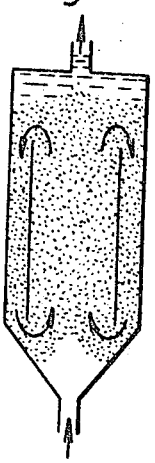
Figure 8:
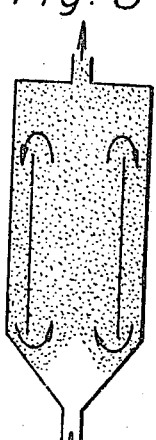

In this state of (4) the fluidization of the particles also takes place in the overflow zone. Accordingly, the upper level of the layer of the solid particles becomes present upward to the uppermost end of the internal cylinder. This state of (4) is classed into the case where the upper level of the layer of the particulate solids is present in the reaction vessel (this condition being hereinafter called "$c$ state") and the case where the upper level of the layer of the particulate solids is not present in the reaction vessel and the particles are accompanied by the fluid and carried away to the outside of the system (this state being hereinafter called "$d$ state"). The "$c$ state" is as shown in FIG. 7, where the particles stay and are present in the overflow zone (2), but the upper level of the particles is not stable and apt to float, and it becomes difficult, unlike the cases shown in FIG. 5 or FIG. 6, to discern the upper level of the particles as a clear surface of demarcation. A complete separation between the particles and the fluid becomes very difficult. In the "$d$ state," there occurs a violent stream of circulation of a completely mixed state, and the fluid discharged from the upper portion of the reaction apparatus contains a large amount of particulate solids. Therefore, some other suitable measure has to be taken in order to separate the fluid from the particulate solids. The state of contact in this case is as shown in FIG. 8. The states ⑤ and ⑥ of FIG. 9 are respectively corresponding to the states of FIG. 7 and FIG. 8.

In the previously described item (3) the value of $v$ under the conditions of $Vt > v \geqq vf$, $\eta > h/\bar{h}$ and $V < vf$ and at the time of gradually increasing $v$ to cause the shifting of the state from the "$a$ state" to the "$b$ state" when the "$a$ state" (namely, $v' \leqq \bar{v}$) is present was presumed to remain at $vt > v \geqq vf$, but it is probable, depending on the case by case basis, that the value of $v$ at the time of said shifting is $v \geqq vt$, which case will be discussed in the following. Even in such a case, even if $v$ is assumed to be smaller than $vf$, the general characteristic, as already mentioned, will not be deprived. So, the state in which $v$ is equal to or larger than $vt$ and $v$ is smaller than $vf$ is called the state of (5) for the explanation's sake. In this state of (5), since $v$ is either equal to or larger than $vt$, there always applies the situation of $\eta > h/\bar{h}$. And that the case that is the state of (5) and the "$a$ state" and the case that is the state of (5) and the "$b$ state" are both the cases of possibility to materialize is apparent from the fact that the discussion is based on the value of $v$ being $v > vt$ at the time of the shifting from the "$a$ state" to the "$b$ state." And such two cases, as already explained in detail, are obviously corresponding to the state of FIG. 5 (the state ③ of FIG. 9) and to the state of FIG. 6 (the state ④ of FIG. 9), respectively. And it is indeed the state of FIG. 6 that is corresponding to the state of contact when the method of the present invention under application for a patent is put to practice. If the value of $v$ is further increased, the value of $v$ becomes larger than $vt$ and the state wherein the value of $vt$ is larger than V which is either equal to or larger than $vf$ will emerge in the long run and it will be understood by applying the above-said explanation as it is that this particular state can be further classified into the two cases of the "$c$ state" and the "$d$ state." It is also obvious that these states are also corresponding to the states of FIG. 7 (the state ⑤ of FIG. 9) and FIG. 8 (the state ⑥ of FIG. 9).

If the value of $v$ is made sufficiently large and in the case of $v > V > vt$, the particles inside the internal cylinder are carried away by the stream of the fluid from the inside of the reaction vessel. In this case, too, like the case of FIG. 8, the separation of the particulate solids inside the reaction vessel has to be carried out by some other method, for instance, by means of cyclone.

To summarize what has been described in the above, the method of the present invention is a method in which the value of $v$ is made a value of speed that is sufficient to fluidize the solid particles in the contact zone and to make them overflow from the contact zone and the contact between the solid and the fluid is made under the conditions of $V < vf$ and $v' > \bar{v}$.

In such a contact state by the method of this invention, the particles fall down into the sedimentation zone at a velocity higher than the spontaneous sedimentation velocity and the fluid also flows downward in this sedimentation zone from the upper portion and circulates within the contact vessel. And since the linear flow rate of the fluid in the overflow zone (2) is smaller than the fluidization initiating velocity of the particles, substantially all of the particles that have overflowed into the overflow zone (2) are immediately moved and circulated to the sedimentation zone.

Before the completion of the present invention, it was anticipated that when the velocity of the particles in the sedimentation zone (3) was higher than their spontaneous sedimentation velocity, that is, in the case of $v' > \bar{v}$, the particles and the fluid would circulate within the contact vessel and the particles would diffuse themselves up to the upper portion of the contact vessel, namely to the upper portion of the overflow zone and accordingly that when the fluid that was contacted was discharged from the upper portion of the overflow zone, the particles would be discharged yielding a very undesirable result. However, it was discovered beyond the anticipation that when the contact is made under the specific conditions mentioned above, in spite of the fact that the particles and the fluid are circulating together within the vessel, the particles are not diffused and discharged and substantially all the particles that have overflowed from the contact zone are immediately moved and circulated to the sedimentation zone.

The advantageous points resulting from the use of the method of this invention are as follows. That is, when the method of this invention is employed, the particulate solids can be replaced, taken out and supplemented without the need to suspend the operation. The solid particles can be supplemented or taken out from the contact zone or from the sedimentation zone.

Also, in the method of this invention, when substantially all of the solid particles that have overflowed into the overflow zone are immediately moved and circulated to the sedimentation zone and the fluid that has been contacted from the overflow zone is eliminated from the system, the solid particles are not eliminated therewith.

Accordingly, it is very easy to separate the particulate solids from the fluid and the use of not only the type of particulate solids that has been conventionally used for the dense phase fluidized bed, but also of the particulate solids of a smaller diameter is possible. Still further, the particulate solids can be separated without any further use in the reaction vessel of any special method for the separation of the particulate solids.

When the contact method of the present invention is applied to the treatment of, for example, hydrocarbons, the catalyst is used as the particulate solids. This particular catalyst is normally one that is prepared by use of the extrusion moulded carrier or the ball-shaped carrier and it is extremely difficult to make a uniform arrangement of the shape of such carriers. In fact, the diameter or the length of the catalytic particles has a broad range of distribution. An attempt to narrow such a wide distribution is not advantageous from the economical point of view, as it will increase the cost of preparation of the catalyst. According to the method of this invention, it is easy to use the catalytic particles having such a wide range of distribution of the diameter or of the length, and even when such a catalyst is employed, it is possible to carry on the operation in a smooth and stable way.

On the one hand, the method of the present invention does not employ any suspension-like material (slurry) which is submitted to vigorous circulation in the system and does not give rise to the problem of erosion or erosion and corrosion. For example, the method of this invention can be used, without any trouble, for the hydrogenation treatment at a high temperature under high pressure of heavy oil containing sulfur, nitrogen and other complex inorganic and organic compounds which produce corrodible substances. Furthermore, when a double-tubed structure apparatus of the method of this invention is used, it reduces, as will be described later, the problem of erosion and that of erosion and corrosion of the inside of the reaction vessel to a noticeable degree, that have been experienced with the conventional methods.

Still further, on the one hand, according to the conventional fluidized bed method, the amount of the fluid to be introduced into the contact vessel is limited within a very narrow range by the amount and kind of the particulate solids introduced into the contact vessel, but in the method of this invention the amount of the fluid to be introduced into the contact vessel can be varied over a wide range indeed, as the previously mentioned contact method is adopted. This means that, by varying the amount of the liquid and gas to be introduced into the reaction vessel relatively freely in the catalytic reaction of the hydrocarbons, for instance, it is possible not only to carry out the kind of operation that is the most preferable according to the properties of the starting material oil and the quality of the finally intended product, but also to take a sufficient measure even when a change of the reaction conditions occurs by accident. The method of the invention proves to have a very excellent feature when applied to a method of contact that requires a broad variable range of operation.

On the other hand, the particulate solids move upward in the state of making a substantial motion and therefore the unevenness in temperature and a great fall in pressure, which are observed in the case of the fixed bed method, do not take place.

Then, in order to make a specific presentation of the method of the invention there will be shown a mode of practice of the invention which is explained in accordance with FIG. 10. The contact vessel that is shown in FIG. 10 is a double tube type of vessel which has an internal cylinder in the inside of the cylinder. In FIG. 10 (1) is the external cylinder of the vessel to be used for the contact method of the invention, which is in the shape of a round tube, and another cylinder (2) is equipped in the inside of said cylinder. The fluid or liquid and gas are introduced from the lower portion of the internal cylinder (2) of the reaction vessel which is charged with the particulate solids by medium of a tube (3), preferably through a distributor (4). In the invention method it is not necessary to use a nozzle, for instance, for the introduction of the fluid to jet it vigorously. The particulate solids to be used here need to have a larger specific gravity than the liquid. Preferably, the specific gravity should be at least 1.05 times as large as that of the liquid. The particulate solids in the cylinder are placed in substantial motion by the fluid (liquid, gas) that is introduced from the lower portion and the particles flow upward. This particular condition is attained in the internal cylinder (5) (contact zone) where the contact is made between the liquid and the solid particles or between the liquid-gas and the particulate solids.

In order to achieve this particular condition of the particulate solids, it is sufficient if liquid or a mixture of liquid with gas is introduced in the amount, by medium of, preferably, a distributor (4), that is determinable with the properties and the amount of the particulate solids and with the structure of the lower portion of both internal and external cylinders, for instance, in an amount that makes a flow rate in the contact zone (5) 0.3–80 cm./sec.

The liquid and particulate solids or the liquid, gas and particulate solids which have ascended inside the contact zone (5) overflow into the space (7), overflow zone, located upward to the uppermost portion (6) of the internal cylinder from said portion of the internal cylinder. The particulate solids which have so overflown are immediately sedimented in the interval (8), sedimentation zone, between the external cylinder (1) and the internal cylinder (2) and continue to circulate. And a part of the overflowed fluid is discharged out of the system as the contacted fluid through the tube (9) or the tube (10). The liquid and the gas that are to be discharged from the reaction vessel can be either separately taken out or taken out by the same tube. The gas is discharged, preferably from the tube (9), and the liquid, preferably from the tube (10).

The remaining part of the overflowed fluid moves downward from up in the interval (8) and circulates through the communicated portions (1) and (2).

In the method of this invention, the lower portion of the sedimentation zone is characterized by the lower portion of the above-said contact zone that is communicated with the former. That is, in FIG. 10 the lower portion of the internal cylinder communicates with the lower portion of the interval (8) between the internal cylinder (2) and the external cylinder (1) at the interval (12).

Particulate solids flow through the interval (12) slowly and continuously to the lower portion of the internal cylinder (2). In the state where the operation is stable, the amount of the solid particles which overflow from the overflow zone (7) and are sedimentated in the sedimentation zone (8) become equal to the amount of the solid particles which pass the communicating portion (12) and move to the contact zone, and the stationary state is maintained between them.

In the invention method the replenishment and discharge of the particulate solids can be performed continuously without the suspension of the contacting operation. The replenishment of the particulate solids can be done in any place of the system, but is done preferably in the overflow zone. In FIG. 10 is illustrated a case where the particulate solids are introduced, either in such particulate state or in the dispersed liquid state, into the lower portion of the overflow zone through medium of the tube (13). Again, the discharge of the particulate solids can be conducted either in the contact zone or the sedimentation zone. In FIG. 10 is shown a case where the discharge of the particles is effected from the contact zone through the tube (14).

A case is shown in FIG. 11 where a contact vessel different from that of FIG. 10 is used. FIG. 11 indicates an example of embodiment of the invention wherein the contact vessel has no internal cylinder and the sedimentation zone is made the tube (2') of the contact vessel. The cylinder (1') is the body of the contact vessel and a sedimentation tube (2'), as shown in said figure, is placed in the inside of the cylinder (1'). Particulate solids are housed in the cylinder (1') and/or the tube (2') and liquid or (liquid and gas is introduced through the distributor (4') from the tube (3'). The particles, as shown in FIG. 1, likewise make a substantial motion and additionaly flow upward. A substantial contact is made in contact zone (5') of the cylinder (1'). The liquid and particulate solids or liquid, gas and particulate solids flowing upward in the contact zone (5') overflow into the overflow zone (7') located into the upper part of (6') from the upper part (6') of (1'). The particulate solids which have overflown are immediately sedimented in the sedimentation zone (8') of the inside of the sedimentation tube (2'). At the same time, a part of the fluid that has overflowed passes through tube (9') and flows out of the system.

Further, the remaining part of the overflown fluid passes the tube (2') and circulates by way of the lower portion of the tube (2'). The lower portion of the tube (2') communicates with the lower portion of the cylinder (1') so that the particulate solids and the fluid circulate within the cylinder (1'). The replenishment of the particulate solids is achieved through tube (13') the extraction of the particulate solids is effected through tube (14'). When the vessel shown in FIG. 11 is used, a contact apparatus is easily provided, and even a large apparatus is acceptable, as the diameter of the tube (2') can be rather freely varied.

The contact method of the present invention can be effectively used in the physical treatments such as absorption, drying, desorption, adsorption and washing. In this case, as the solid particles, there are used diatom earth, bauxite, natural or synthetic zeolite, various metals, ore, pulverized products, silica gel, alumina gel, various pigments, glass beads, borax, other minerals and porous materials, and as the liquid, various solvents such as various aqueous solutions, hydrocarbons, mineral oil, alcohols and ketones, and as the gas, air nitrogen, lower hydrocarbons, hydrogen, ammonia, steam, carbon monoxide, hydrogen sulfide, sulphurous acid gas and other gaseous compounds, according to the respective purpose.

On the other hand, the contact method of the invention can be utilized in the various chemical treatments including oxidation, reduction, hydration and decomposition. In these cases the particulate solids are used as the catalyst of which surface is usually provided as the surface of contact, and work effectively in the caes where the particulate solids themselves perform these reactions. The method of this invention becomes more effective particularly when applied to the conversion methods of hyrocarbons such as isomerization, dehydrogenation, polymerization, reformation, alkylation, decomposition by hydrogenation, hydrodesulfurization, etc. In this case the particulate solids are used as the catalysts. As these catalysts, alumina substances, silica alumina substances, other crystalline and non-crystalline porous materials are normally used as they are or they are used as the carriers on which other active metals are supported.

The property and the shape of the particulate solids usable in the invention method cover a wide range. The specific gravity of the particulate solids needs to be larger than the specific gravity of the liquid, and is preferably at least 1.05 times more than the specific gravity of the latter. They can take the form of a ball, round column and other various shapes. Those having an average particle size of 0.05 mm.–10 mm. are perferred. Particularly those whose particle size averages between 0.2 mm. and 2 mm. would be effective. In the method of this invention which is a contact method with the performance of an overflow of particulate solids the separation between the liquid and the particulate solids becomes easy to conduct and therefore the use of particulate solids of such a small grain size that would make it rather difficult to separate from the liquid in the conventional methods is now made possible. Generally speaking, in the method of contacting liquid with particulate solids or liquid with gas and particulate solids those particles which have a large surface area per unit weight of the particles are preferred to be used in order to obtain an intimate contact, and the method of this invention meets this particular purpose and adds to the industrial value.

In order that the method of the invention may be practiced in an effective way, the flow rate of the liquid or the gas that is introduced into the contact vessel and caused to go up the contact zone is made normally 0.1–100 cm./sec., preferably 0.3–80 cm./sec.

In the method of the invention, although there is some degree of limitation on the flow rate according to the specific gravity, amount and average diameter of the particulate solids and to the specific gravity and viscosity of the liquid as well as to the shape of the vessel, the flow rate can nevertheless be varied during the continuing operation.

Furthermore, in practicing the method of this invention, there can be used a wide range of temperature and pressure and further more than one reaction vessel of the method of the invention can be employed either in parallel or in series.

Still further, in the method of this invention, when a gas-liquid-solid contact is to be materialized, such a contact can be made more effectively by introducing the gas not only to the contact zone, but to the sedimentation zone as well, though limited to certain cases.

When the method of the invention is applied, there can be cited the hydrodesulfurization treatment of heavy oil as an example of reaction in which the method of this invention displays its advantages most, as compared with other methods. Particularly, it is effective for the hydrodesulurization treatment of the sulfur-containing hydrocarbon oil (to be referred to as heavy oil) that contains a substantial amount of oil remaining after the distillation of petroleum, known generally as the heavy oil. In general the hydrodesulfurization of such heavy oil is carried out by contacting heavy oil with hydrogen at a high temperature under high pressure in the presence of a suitable catalyst. That is, a greater part of heavy oil undergoes a reaction in the liquid phase at a reaction temperature of 250° C.–600° C. under reaction pressure of 50 kg./cm.$^2$·g.–350 kg./cm.$^2$·g. The term "suitable catalyst" as used herein means such a sulfur resistant catalyst supported, for instance, on the alumina or silica alumina carrier, as the nickel-molybdenum catalyst, nickel-cobalt-molybdenum catalyst, cobalt-molybdenum catalyst, nickel-tungsten catalyst and nickel-cobalt-tungsten catalyst, said catalysts being in terms of the shape, ball-shaped catalysts, extrusion-moulded catalyst and pellet-like catalysts, and all the catalysts which have been used conventionally in such a hydrogenation treatment of heavy oil can be used.

The size of the catalytic particles to be used in the method of this invention, although ones having a very broad range of grain size can be used, is preferably in the range of 0.1 mm.–10 mm. in the diameter of the catalytic particles. In the hydrosulfurization treatment of heavy oil generally it is usual to carry out said treatment with the filling amount of the raw material oil being on the order of 0.2–2.0 (hr.$^{-1}$) in liquid space velocity on the basis of the amount (by volume) of the catalyst in the reaction vessel. Now, in the method of this invention it has been made possible to carry out the same treatment usually at a liquid space velocity of 0.5–5.0 (hr.$^{-1}$), relative to the volume of the contact zone. Also, the said treatment is preferred to be carried out at a filling amount of water of 50–300 H$_2$-NTP/feed oil (by volume), relative to the filling amount of the feed oil. Generally speaking, in such an operation it is usual to use the unreacted hydrogen gas from the reaction vessel by making it circulate, in the method of this invention, too, the unreacted hydrogen gas is preferred to be used by circulation. When the catalyst is fluidized to use, it is general that the linear flow rate of the liquid that is required to fluidize the catalyst should differ with the physical characteristic and shape of the particles of the catalyst, and in the method of this invention such operation is preferred to be carried out at a density of the catalyst layer present in the contact zone of 0.9–0.2 of the density of the catalyst layer present in the state where the catalyst layer is left undisturbed. In order to obtain this particular state the heavy oil is generally submitted to recycling by means of a pump disposed outside of the system. But when the particles of the catalyst having a small diameter are used, the circulation of heavy oil is not always necessary. Although the amount of the circulating gas varies with the amount of the circulating heavy oil, the circulation of the gas is preferred to be carried out in the following range. Namely, 10 ≦ the amount of hydrogen to be introduced into the reaction vessel (NTP, vol.)/ the amount of heavy oil to be introduced into the reaction vessel (vol.) ≦ 200

EXAMPLE 1

Hydrodesulfurization reaction was carried out, using the type of a reaction vessel that is shown in FIG. 10 and the raw material oil, catalyst, reaction conditions and the reaction vessel that are indicated in Table 1, with the result that the products having properties as shown also in Table 1 were obtained. The extraction of the catalyst was effected from the contact zone. During the process of the experiment the state of the catalyst inside the reaction vessel was observed by gamma rays. The catalyst was not detected in the portion situated upward from the top of the internal cylinder, and almost the same density of the catalyst was detected in any and all places in the portion lower than the top of the internal cylinder. For the information, the amount of the catalyst particles that were accomplished by the fluid and came out of the reaction vessel in the course of operation was about 0.3% of the amount of catalyst first packed into the reaction vessel. This demonstrates that in spite of the fact that the catalyst particles having a small diameter were used, the separation of the catalyst particles in the reaction vessel was very good. Also, the temperature of the contact zone in the reaction vessel was subjected to the five point measurement, the result of which indicated that the maximum temperature difference was 3° C. and the state of flowing was good and the reaction heat was almost completely eliminated and there was no local heating present. The consumption of hydrogen was 130 l.-NTP/l.-feed oil which was rather smaller than that which is generally said to be, indicating that the amount of hydrogen consumed for the decomposition of oil and the like was small. In other words, the degree of heavy oil turning to light oil is small and this can be understood also from the decrease in quality of the product. This is considered to be due to the fact that the desulfurization reaction proceeds effectively even at a relatively low reaction temperature and the reaction such as decomposition, etc. are checked.

In addition, there was not a single trace of erosion, corrosion and erosion-corrosion seen on the apparatus during the operation, and abrasion and deformation of the catalyst also not observed.

TABLE 1

| Item | Raw material oil (feed oil) | Product |
|---|---|---|
| Properties of the oil: | | |
| Kind of the raw material oil | Kafuji oil remaining after normal pressure distillation. | |
| Total sulfur content (wt. percent). | 4.10 | 0.88 |
| Ratio of sulfur removed (percent). | | 78.5 |
| Carbon that remained (wt. percent). | 11.73 | 5.97 |
| Yield against the raw material (wt. percent). | | 96.9 |
| Viscosity (cst. at 50° C.) | 1,061 | 302.4 |
| Catalyst: | | |
| Kind of the catalyst | Co-Mo catalyst supported on the silica alumina carrier. | |
| Shape of the particles | 0.4 mm.—1.2 mm. in diameter, ball shaped. | |
| True specific gravity | 3.57. | |
| Reaction conditions: | | |
| Reaction temperature (° C.) | 382. | |
| Pressure (kg./cm². g.) | 150. | |
| LSV (vol./vol./hr.) | 1.03. | |
| Running operation time (hr.) | 430. | |
| Linear flow rate of oil in the reaction vessel (cm./sec.). | 3.2. | |
| Linear flow rate of gas in the reaction vessel (cm./sec.). | 0.92. | |
| Filling amount of hydrogen | 200 (m.³—NTP)/feed oil (m.³). | |
| Amount of the catalyst replaced | 0.09 wt. percent/hr. | |
| Dimension of the reaction vessel: | | |
| Height of the reaction vessel | 4.0 m. | |
| Inner diameter of the internal cylinder. | 200 mm. | |
| Height of the internal cylinder | 3.5 m. | |
| Clearance in the sedimentation zone. | 2 cm. | |

EXAMPLE 2

The hydrodesulfurization reaction was carried out, using the type of a reaction vessel that is shown in FIG. 11 and the raw material oil (feed oil), catalyst, reaction conditions and the reaction vessel that are indicated in Table 2, with the result that the product having properties as indicated in Table 2 could be also obtained. The catalyst was replaced every 20 hours. The taking-out of the catalyst was performed from the contact zone. According to the gamma-ray levelling meter, the movement of the catalyst particles was smoothly made in such a reaction vessel, and in the portion located to the above of the upper end of the sedimentation tube the presence of any catalyst was not detected and the presence of the catalyst was detected in almost the same density in any place in the portion located below the said portion. The separation of the catalyst particles was good and the loss of the catalyst from the reaction vessel in operation accounted for 0.6% of the amount packed initially into the reaction vessel. There was not a single trace of erosion, corrosion and erosion-corrosion in the contact zone and the sedimentation zone. Also, the change of the shape of the catalyst particles could not be observed.

TABLE 2

| Item | Raw material oil (feed oil) | Product |
|---|---|---|
| Properties of the oil: | | |
| Kind of the raw material oil | Kafuji normal pressure distillation residual oil. | |
| Total sulfur content (wt. percent). | 4.11 | 0.78 |
| Ratio of the sulfur removed (percent). | | 81.0 |
| Residual carbon (wt. percent) | 11.91 | 6.08 |
| Yield against the raw material (wt. percent). | | 95.9 |
| Viscosity (cst. at 50° C.) | 1014 | 321.5 |
| Catalyst: | | |
| Kind of the catalyst | Ni-Co-Mo catalyst based on the silica alumina carrier. | |
| Shape of the catalyst | 0.3–1.0 mm. in diameter, ball-shaped. | |
| True specific gravity | 3.60. | |
| Reaction conditions: | | |
| Reaction temperature (° C.) | 390. | |
| Reaction pressure (Kg./cm.² g) | 170. | |
| LSV (vol./vol./hr.) | 1.04. | |
| Running operation time (hr.) | 500. | |
| Linear flow rate of the oil in the reaction vessel (cm./sec.). | 2.8. | |
| Linear flow rate of the gas in the reaction vessel (cm./sec.). | 1.07. | |
| Filling amount of hydrogen | 188 (m.³-NTP)/feed oil (m.³). | |
| Amount of the catalyst replaced | 0.10 percent/hr. | |
| Dimension of the reaction vessel: | | |
| Height of the reaction vessel | 4.0 m. | |
| Inner diameter of the reaction vessel. | 240 mm. | |
| Inner diameter of the sedimentation tubes (four tubes are the same). | 30 mm. | |
| Length of the sedimentation tubes. | 3.5 m. | |

EXAMPLE 3

Straight-run gasoline obtained by the fractionation of heavy oil, filtered oil and light oil as well as other fractions of heavy oil contains compounds of mercaptans, and these compounds of mercaptans give off a strong unpleasant odor and do the damage of corrosion to the material of the apparatus. An effective method of removing these mercaptan compounds is a method of extraction by an alkaline aqueous solution, followed by the oxidation in the presence of a catalyst with the use of an oxidizing agent like air to form disulfide compounds, separating the resulting product from the alkaline aqueous solution and using the same alkaline aqueous solution repeatedly.

The method of this invention was used for the oxidation of the alkaline aqueous solution which had been used to extract mercaptan compounds. The shape of the reaction vessel and the reaction conditions, that were employed, are shown in Table 3.

During the experiment the catalyst particles showed few signs of wear and were used continuously for approximately 700 hours, but they were not deformed, nor was a decline in their activity observed. Owing to the catalyst particles which were flowing, the dispersion of the gas was very good and a high conversion ratio was obtained.

As the reaction vessel was used that which had the same shape as described in Example 1.

TABLE 3

| Conditions: | |
|---|---|
| Liquid raw material | Straight-run gasoline (containing mercaptan and sulfur in the concentration of 153 p.p.m.) extracted using 2-normal caustic soda solution at a solvent ratio of 2.5 and the mercaptan-sulfur concentration in raffinate was made 22 p.p.m. |
| Reaction temperature (° C.) | 27° C. |
| Reaction pressure (kg./cm.² g.) | 0.52 kg./cm.² g. |
| Catalyst | Polycobalt and phthalocyanine were supported on the activated carbon having particles of a 0.8 mm. diameter. |
| Oxidizing agent (Air tower standard) | Air. |
| Linear flow rate of the liquid (cm./sec.) (Air tower standard) | 0.6–3.0. |
| Linear flow rate of the gas (cm./sec.) | 0.5–2.0. |
| Mercaptan-sulfur concentration in the product (p.p.m.) | 11. |
| Shape of the reaction vessel: | |
| Height of the reaction vessel | 4.0 m. |
| Inner diameter of the internal cylinder | 200 mm. |
| Height of the internal cylinder | 3.5 m. |
| Clearance in the sedimentation zone | 2.0 cm. |

By the way, before the methods as shown in the examples of this invention were put to practice, there was carried out a model experiment with the use of an internally observable acrylic vessel having exactly the same shape of the reaction vessel mentioned above, instead of said reaction vessel, when it was clearly observed that the catalytic particles overflowed from the upper end of the internal cylinder and were immediately sedimented in the interval between the internal cylinder and the external cylinder. On the one hand, there was not seen a precipitated layer of the particles in the sedimentation zone and a circulation of the liquid was observed instead. However, in the liquid that was taken out from the upper portion of the reaction vessel was not found at all any catalytic particles minglingly present with the liquid.

What is claimed is:

1. A method of contacting fluid with particulate solids with the use of a reactor having (1) a contact zone, (2) an overflow zone, the lower portion of which communicates with the upper portion of the contact zone and the cross sectional area of which is greater than the cross sectional areas of the contact zone, and (3) a settling zone, the upper portion of which communicates with the lower portion of the overflow zone and the lower portion of which communicates with the lower portion of the contact zone, comprising (a) accommodating particulate solids within said contact zone, (b) introducing said fluid selected from the group consisting of liquid and liquid-gas mixtures into the lower portion of said contact zone, and (c) circulating continuously said particulate solids and fluids from the lower portion of said contact zone to the upper portion of said contact zone to the lower portion of said overflow zone to the upper portion of said settling zone to the lower portion of said settling zone and to the lower portion of said contact zone, and discharging a portion of said contacted fluid from the upper portion of said overflow zone, wherein the fluid contacts the particulate solids under the conditions $V<vf$ and $v'>\bar{v}$ as well as either of the conditions (A) $vt>v\geq vf$ and $\eta>h/\bar{h}$, or (B) $v\geq vt$.

2. The method as set forth in claim 1 wherein said fluid consists of only liquid.

3. The method as set forth in claim 1 wherein said fluid is a mixture of liquid with gas in the form of liquid and bubbles.

4. The method as set forth in claim 1 wherein the specific gravity of said particulate solids is at least 1.05 times as much as that of said liquid.

5. The method as set forth in claim 1 wherein the average particle size of said particulate solids is in the range of 0.05–10 mm.

6. The method as set forth in claim 5 wherein the average particle size of said particulate solids is in the range of 0.2–2 mm.

7. The method as set forth in claim 1 wherein the linear flow rate of said fluid passing through said contact zone (1) is in the range of 0.1–100 cm./sec.

8. The method as set forth in claim 1 wherein the linear flow rate of said fluid passing through said contact zone is in the range of 0.3–80 cm./sec.

References Cited

UNITED STATES PATENTS

| 3,639,230 | 2/1972 | Oguchi et al. | 208—213 |
| 3,674,682 | 7/1972 | Mitchell et al. | 208—157 |
| 3,365,388 | 1/1968 | Scott | 208—110 |
| 3,617,524 | 11/1971 | Conn | 208—157 |

FOREIGN PATENTS

| 843,842 | 7/1952 | Germany | 208—143 |
| 2,005,194 | 12/1969 | France | 208—213 |

HERBERT LEVINE, Primary Examiner

U.S. Cl. X.R.

134—25 R, 42; 208—213; 210—63; 252—364

UNITED STATES PATENT OFFICE
CERTIFICATE OF CORRECTION

Patent No. 3,826,739          Dated July 30, 1974

Inventor(s)     Junichi KUBO ET AL

It is certified that error appears in the above-identified patent and that said Letters Patent are hereby corrected as shown below:

In the Heading, insert the following:

-- Claims priority, application Japan, No. 45-122504/70,

December 30, 1970. --

Signed and Sealed this

Thirty-first Day of May 1977

[SEAL]

Attest:

RUTH C. MASON  
Attesting Officer

C. MARSHALL DANN  
Commissioner of Patents and Trademarks